INVENTOR:
FREDERICK TRINCA,

BY  C. C. Hineb,

ATTORNEY.

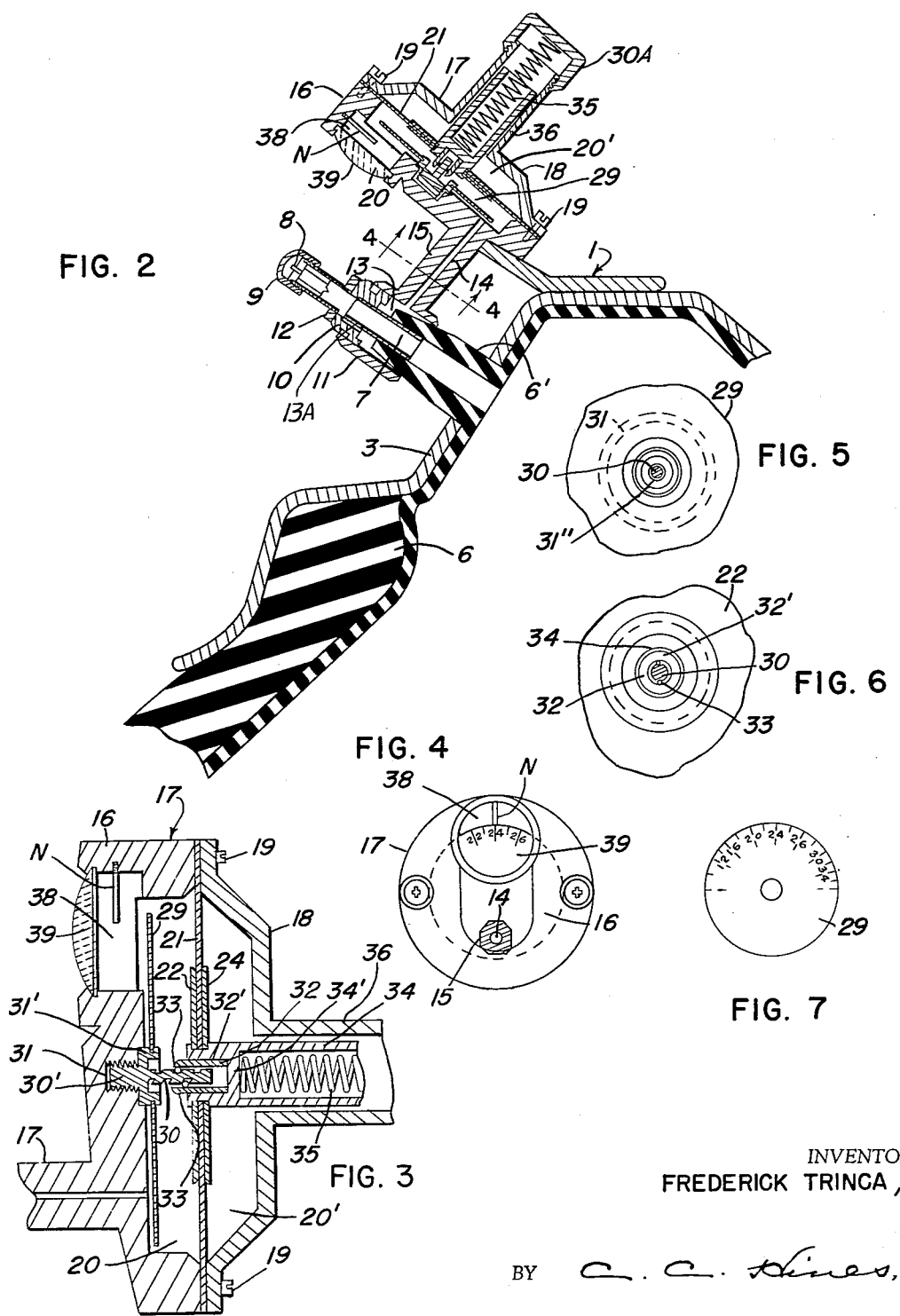

United States Patent Office 2,747,409
Patented May 29, 1956

2,747,409

READY-SIGHT-READING TIRE PRESSURE GAGE

Frederick Trinca, Middle Village, N. Y.

Application October 27, 1953, Serial No. 388,830

1 Claim. (Cl. 73—408)

This invention relates to a pressure gage for the pneumatic tires of pneumatically-tired vehicle wheels and its main object is to provide a ready-reading tire pressure gage adapted to be permanently attached to a vehicle wheel and connected to a tire mounted thereon and which will visually indicate at any and all times the state of the air pressure in the tire, thereby enabling a motorist or service man to check all tires of the vehicle without loss of time to correct the pressure condition of an over-inflated or an underinflated tire.

A further object of the invention is to provide a gage of this character which is simple and inexpensive in construction, which is reliable and efficient in action, which may be mounted for permanent use on a vehicle wheel in a ready and convenient manner, and which may be operatively arranged to show at a glance the amount of air pressure contained in the tire with which it is connected.

With these and other objects in view, which will appear in the course of the subjoined description, the invention consists of the novel construction, combination and arrangement of parts, hereinafter fully described, and shown in the accompanying drawings, in which:

Fig. 2 is a view similar to Fig. 1 but showing the pressure gage and parts connected to the valve stem in section taken axially of the gage.

Fig. 3 is a sectional view similar to Fig. 2, but on an enlarged scale, through the gage proper, showing in detail the construction of the dial operating mechanism.

Fig. 4 is a section on the line 4—4 of Fig. 2 looking toward the face plate of the gage.

Figs. 5 and 6 are detail vertical transverse sectional views through the housing of the pressure gage looking respectively toward the dial and toward the diaphragm.

Fig. 7 is a front face view of the dial plate apart from the device as a whole.

Figure 1:
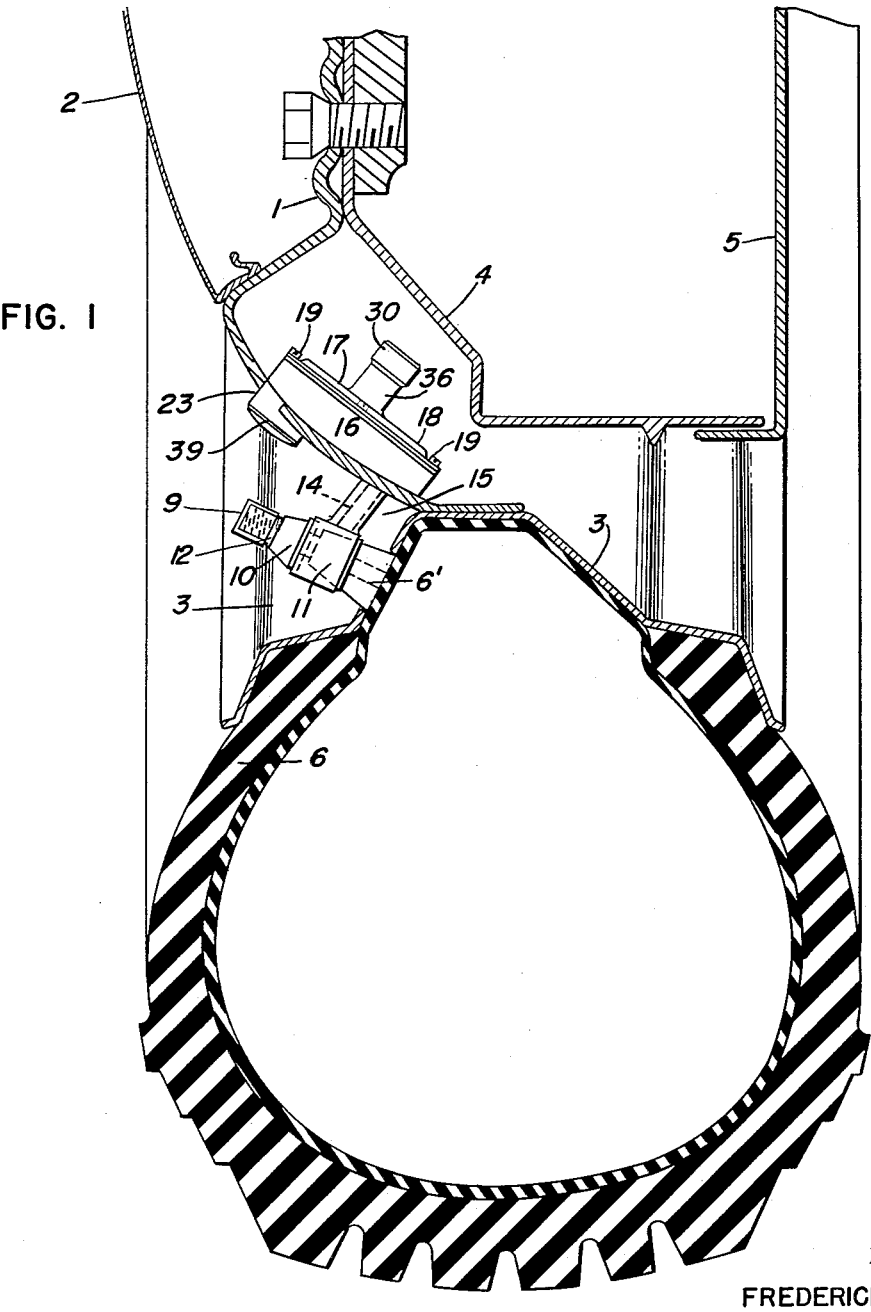
Fig. 1 is a vertical transverse section through a portion of one of the wheels of a vehicle, the associated brake drum, and a pneumatic tire mounted on the wheel rim, showing in elevation the pressure gage as operatively mounted for use on the wheel and connected to the tire.

Referring now more particularly to the drawings, 1 designates the dished disk body, 2 the hub cap, 3 the rim and 4 the brake drum of an automobile or like wheel of conventional type, which drum is closed at its inner side by the usual cover or back plate 5 mounted in practice on the wheel axle housing. Mounted on the rim 3 is a pneumatic tire 6 of a conventional type which is provided with a nipple 6' extending outwardly through the rim and carrying a valve stem 7 provided with the usual tire inflating and deflating valve means, the valve pin 8 only part of which is shown, together with the stem closure cap 9. In the construction disclosed the stem 7 is fitted at its inner end in the nipple 6' and extends into a seating collar or bushing 10 in a coupling sleeve 11 which surrounds the outer end of the nipple, said bushing being held in place by a retaining nut or other suitable fastening 12. The nipple and bushing are also disposed in spaced relation to provide an annular opening 13 communicating with the bore or passage 14 of a tubular stem 15 connecting the sleeve with the combined body and body portion 16 of a pressure gage 17, said sleeve, stem and portion 16 being integral with each other and forming a unitary part of the gage adapting the gage to be operatively connected with the valve stem of any tire mounted from time to time on the wheel rim.

The gage 17 comprises a housing formed of the body portion 16, above referred to, and a cap portion 18 detachably secured thereto, as by fastening screws 19. Between these portions is clamped a flexible diaphragm 21 dividing the housing into two chambers 20, 20'. The portion 16 of the housing is fitted in an opening 23 in the wheel body plate 1 adjacent to and facing the valve stem and connected therewith by the conducting stem 15, through which the chamber 21 is in constant communication with the opening 13 and hence with the air space of the tire, so that the diaphragm 21 is always exposed on its side facing the chamber 20 to the pressure in the air space of the tire. Communication between the tire space and the space 13 is provided by means of a groove 13A, as shown. The diaphragm is stiffened to a certain degree by plates 22, 24 applied to its adverse and reverse faces, and secured at its forward end to the diaphragm is a guide sleeve 34 fitted to slide in a housing tube or stem 36 formed on the cap portion 18. Carried by the sleeve 34 is a driver tube 32 which is fitted in a socket 32' formed in the sleeve 34 by a partition forming an abutment head 34'. A pressure spring 35 is arranged in the sleeve 34 and stem 36 between the abutment head 34' and a screw cap 30A closing and adjustably engaging the outer end of said stem, which spring acts on the diaphragm in opposition to the tire pressure. By adjustment of the cap 30A the pressure of the spring may be regulated with respect to the tire pressure to keep the pressures balanced when the pressure in the tire is at the preselected pressure, as well as to set the gage to operate at the preselected pressure for the tire or a desired arbitrary pressure.

Formed in the casing portion 16 is a bearing socket or recess 31 which is internally threaded to receive the threaded butt end 30' of a helically or spirally grooved or bladed impeller shaft 30 having a hub portion 31' to which an indicating dial plate 29 is suitably attached. The grooved body portion of the shaft fits in the driver 32 which carries a pair of teeth in the form of antifriction balls 33 which engage the groove in the shaft. By this construction of spiral drive connection between the diaphragm and dial the latter will be turned in one direction or the other, when the diaphragm is moved in one direction or the other, to indicate low or high variations from the normal pressure of the pressure of the air in the tire. In practice, the threaded connection between the shaft and wall of the socket may be sufficiently loose to allow the shaft and dial to turn with a proper rate of freedom, but sufficiently tight to provide a drag or frictional resistance to the rotation of the shaft and dial to prevent overthrow (excess movement) of the latter. This threaded connection, furthermore, provides a shiftable abutment which allows a motion translating differential between the reciprocatory and rotary parts which ensures smooth rotation of the dial to an exact degree in its shifts under pressure changes.

The outer face of the dial plate bears suitable numerals and gage marks to indicate pressures. These may be, as shown, from 12 to 24, inclusive, 12 indicating low pressure, to 24 indicating normal pressure, and 24 to 34 inclusive, indicating over pressures, or the pressure scale may extend through any other pressure range. When the pressure in the tire is normal or at the preselected pressure, the numeral 24 on the dial will register with a fixed mark N on a part of the housing, while, when the pressure is below or above normal, a numeral on the dial at one side or the other of the dial numeral 24 will register with the mark N to indicate that the pressure is below or above the normal or preselected pressure. The figures on the dial are arranged to show through a window in the plate 16, which may consist of an opening 38 sealed by a transparent panel or bull's eye 39.

It will be obvious from the foregoing that the pressure gage is arranged on the disked wheel body so as to lie within the plane of the wheel, where it will be less liable to be injured by contact with extraneous objects, while it is so disposed that the gage with its dial may be conveniently inspected by the motorist or a serviceman standing by the wheel, so that when the vehicle is standing still all of its tires may be quickly checked with a great saving of time and labor over the customary practice of applying a gage to each valve stem in turn in checking the individual tires. Furthermore, my improved gage does not require the use of any special type of valve stem and may be applied to any conventional type of automobile, without any material change in the construction of automobile for use with tires applied from time to time during the lifetime of the vehicle.

It is to be understood that while the particular construction shown is preferred, changes in the form, construction and arrangement of the parts, falling within the scope of the appended claim, may be made without departing from the spirit or sacrificing any of the advantages of the invention.

Having thus described my invention, I claim:

A pressure gage for a pneumatic tire, said gage comprising a body portion having a chamber therein, said chamber comprising a wall movable in response to air pressure changes therein; means, including a tubular stem projecting from the body portion, for communicating said chamber with the interior of the tire; a circular disc rotatably mounted in said chamber and having angular markings designating pressure intervals; means for rotating said disc in angular amounts corresponding to movements of the wall, said means comprising a shaft carried by the disc on one side thereof and axially disposed relative thereto, said shaft having a helical groove; a ball carried by the movable wall and engaged with said groove; a threaded spindle carried by the disc and projecting axially therefrom on the other side; said body portion having a threaded socket threadedly engaging said spindle; said wall portion including a transparent panel adjacent said disc for viewing said markings; and an indicator fixed to the body portion adjacent said markings.

References Cited in the file of this patent

UNITED STATES PATENTS

| | | |
|---|---|---|
| 1,128,327 | Keith | Feb. 16, 1915 |
| 1,156,862 | Sibley | Oct. 12, 1915 |
| 1,489,164 | Smith | Apr. 1, 1924 |
| 1,601,315 | Manning | Sept. 28, 1926 |
| 2,168,145 | Willis | Aug. 1, 1939 |
| 2,190,530 | Clarkson | Feb. 13, 1940 |
| 2,437,371 | Allen | Mar. 9, 1948 |
| 2,481,534 | Robertson | Sept. 14, 1949 |